United States Patent
Hammes et al.

(10) Patent No.: US 6,774,738 B2
(45) Date of Patent: Aug. 10, 2004

(54) TRIMMING METHOD FOR A TRANSCEIVER USING TWO-POINT MODULATION

(75) Inventors: Markus Hammes, Dinslaken (DE); Stefan Van Waasen, Duisburg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/607,543

(22) Filed: Jun. 26, 2003

(65) Prior Publication Data

US 2004/0048590 A1 Mar. 11, 2004

Related U.S. Application Data

(63) Continuation of application No. PCT/DE01/04956, filed on Dec. 28, 2001.

(30) Foreign Application Priority Data

Feb. 2, 2001 (DE) .......................................... 101 04 775

(51) Int. Cl.$^7$ ........................... H03C 3/00; H04L 27/10; H03L 7/00
(52) U.S. Cl. ........................... 332/100; 331/16; 331/17; 331/23; 375/272; 375/376
(58) Field of Search ................................. 332/100–102, 332/127; 327/156–159; 331/1 A, 10, 16, 17, 23, 25; 360/51; 375/272–278, 303–308, 376; 455/260

(56) References Cited

U.S. PATENT DOCUMENTS

| 5,983,077 A | 11/1999 | Dent |
| 6,034,573 A | 3/2000 | Alderton |
| 6,172,579 B1 * | 1/2001 | Dacus et al. ................ 332/128 |

FOREIGN PATENT DOCUMENTS

| DE | 690 26 151 T2 | 1/1991 |
| DE | 199 29 167 A1 | 12/2000 |
| EP | 0 408 238 B1 | 1/1991 |
| EP | 1 063 766 A2 | 12/2000 |

* cited by examiner

Primary Examiner—David Mis
(74) Attorney, Agent, or Firm—Laurence A. Greenberg; Werner H. Stemer; Gregory L. Mayback

(57) ABSTRACT

In a method for amplitude trimming in transceivers having a PLL circuit operating on the two-point modulation principle, the amplitude of an analog modulation signal is selected on the basis of a modulation shift of a defined digital modulation signal. A predetermined data sequence of the analog modulation signal is applied, the modulation shift of the analog modulation signal is determined, and the amplitude of the analog modulation signal is corrected to match the difference between the modulation shift of the digital modulation signal and the determined modulation shift of the analog modulation signal.

12 Claims, 3 Drawing Sheets

TRIMMING METHOD FOR A TRANSCEIVER USING TWO-POINT MODULATION

CROSS-REFERENCE TO RELATED APPLICATION

This application is a continuation of copending International Application No. PCT/DE01/04956, filed Dec. 28, 2001, which designated the United States and which was not published in English.

BACKGROUND OF THE INVENTION

FIELD OF THE INVENTION

The invention relates to a trimming method for PLL circuits which operate on the principle of two-point modulation. The invention relates, in particular, to a method for amplitude trimming in transceivers for mobile radio systems having a PLL circuit, which operates on the principle of two-point modulation, in the transmitter and having a receiver which operates on the limiter/discriminator principle.

A low-complexity implementation of a transmitter concept for transceivers in mobile radio systems is provided by transmitters having a modulator which operates on the principle, which is known per se, of two-point modulation, in which it is possible to modulate a PLL (phase locked loop) circuit with signals whose bandwidth is greater than the PLL bandwidth, so that the PLL circuit has a transmission response which is independent of frequency.

FIG. 3 shows, in simplified form, a prior art PLL circuit, which operates on the principle of two-point modulation, for such a transmitter. The circuit has a phase frequency detector (PFD) 1, a charge pump (CP) 2, a loop filter (LF) 3 and a voltage controlled oscillator (VCO) 5 in the forward path. There is provided a frequency divider 6 with divisor N in the feedback path of the modulator.

In order to produce the two-point modulation, analog modulation is introduced into the PLL circuit, which has been stabilized at the channel mid-frequency before the actual transmission process, at a summation point 4 which is located upstream of the voltage controlled oscillator 5 in the forward path and represents a high-pass point (analog modulation which is fed in at this point acts on the output with high-pass filtering provided by the closed control loop), and digital modulation is introduced into the PLL circuit, which has been stabilized at the channel mid-frequency before the actual transmission process, in the feedback path at the frequency divider 6, which represents a low-pass point. The two modulation signals are then superimposed at the output of the PLL circuit so as to produce the desired frequency-independent response.

In this type of transmitter concept, the PLL control loop remains closed. Owing to the requirements for the noise response, the bandwidth of the PLL control loop is furthermore designed to be narrower than would be necessary for transmitting modulated data. Thus, in addition to the pure digital modulation, the analog modulation is used to compensate for the restricted bandwidth in which case, in addition to the analog and digital modulation being synchronized in phase, it is of major importance that the amplitudes of these two modulation signals match.

Owing to the production tolerances in the components that are used for analog modulation, with regard, for example, to the modulation gradient, the production of the modulation voltage and the like, it is necessary to carry out amplitude trimming between the analog modulation and the digital modulation after production. If, furthermore, it is also necessary to take into account influences caused by temperature changes, this amplitude trimming must be carried out before every transmission process.

One prior art trimming method is to introduce the two modulations, to supply the output signal from the PLL circuit to an external measurement receiver, to demodulate it there, and to carry out appropriate amplitude trimming. Since the voltage controlled oscillator 5 has a non-linear frequency response as a function of the voltage, such amplitude trimming must, however, be carried out for each of a large number of channels, which leads to a long measurement duration and, furthermore, requires that the trimming information be stored in a memory. Furthermore, it is not possible to take account of influences resulting from temperature changes in this way.

A further known trimming method includes the reception and demodulation by the receiver section of the transmitter/receiver. However, a complete second PLL circuit is required in the receiver for this purpose, which, in addition to considerably greater circuit complexity and greater costs associated with this complexity, makes it necessary when using a heterodyne receiver to set this receiver to a frequency which corresponds to the difference between the transmission frequency and the intermediate frequency.

The prior art trimming methods thus have the disadvantage that they are associated on the one hand with a long measurement duration and on the other hand with a high level of equipment and circuitry complexity, with correspondingly high costs.

SUMMARY OF THE INVENTION

It is accordingly an object of the invention to provide a trimming method for a transceiver with two-point modulation which overcomes the above-mentioned disadvantages of the heretofore-known devices and methods of this general type and which allows rapid amplitude trimming with little complexity, and which makes it possible to take into account temperature influences.

With the foregoing and other objects in view there is provided, in accordance with the invention, a trimming method for a transmitter/receiver having a phase locked loop circuit operating on a two-point modulation principle. The method comprises the following steps:

selecting an amplitude of an analog modulation signal based on a modulation shift of a defined digital modulation signal;

applying a predetermined data sequence of the analog modulation signal;

determining a modulation shift of the analog modulation signal at an output of the receiver; and correcting the amplitude of the analog modulation signal to match a difference between the modulation shift of the digital modulation signal and the modulation shift of the analog modulation signal.

In other words, the objects are achieved, according to the invention, with a trimming method for a transmitter/receiver having a PLL circuit which operates on the principle of two-point modulation, as follows: selection of the amplitude of an analog modulation signal on the basis of the modulation shift of a defined digital modulation signal; application of a predetermined data sequence of the analog modulation signal; determination of the modulation shift of the analog modulation signal at an output of the receiver; and correction of the amplitude of the analog modulation signal to match the difference between the modulation shift of the digital modulation signal and the determined modulation shift of the analog modulation signal.

Before carrying out the trimming process, the PLL circuit is set to a channel mid-frequency before a transmission process, in order to produce a steady state.

The digital modulation signal is preferably deactivated during the trimming process, in order to prevent the analog modulation being regulated out when selecting an initial amplitude for the analog modulation signal.

The predetermined data sequence of the analog modulation signal is furthermore preferably applied to a predetermined high-pass point in the forward path of the PLL circuit, and the digital modulation signal is applied to a predetermined low-pass point in the feed-back path of the PLL circuit, thus resulting in the PLL circuit having an overall transfer function which is advantageous for the response of the arrangement.

The digital modulation signal is in this case applied in some suitable manner to a first frequency divider.

If the output signal from the PLL circuit is passed to a second frequency divider, which is located in a signal path which branches off from the feedback path, is divided in the second frequency divider and is then supplied as one of the input signals to the receiver, there is advantageously no need for a second PLL circuit in the receiver.

The divisor of the second frequency divider is in this case preferably selected such that the output frequency from the second frequency divider corresponds to the intermediate frequency of the receiver.

Alternatively, an integer value may be selected as the divisor of the second frequency divider such that the output frequency from the second frequency divider is essentially close to the intermediate frequency of the receiver, thus resulting in an additional degree of freedom for the selection of the divisor for the second frequency divider, taking into account the actual frequency band of the receiver.

Other features which are considered as characteristic for the invention are set forth in the appended claims.

Although the invention is illustrated and described herein as embodied in a trimming method for a transceiver using two-point modulation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
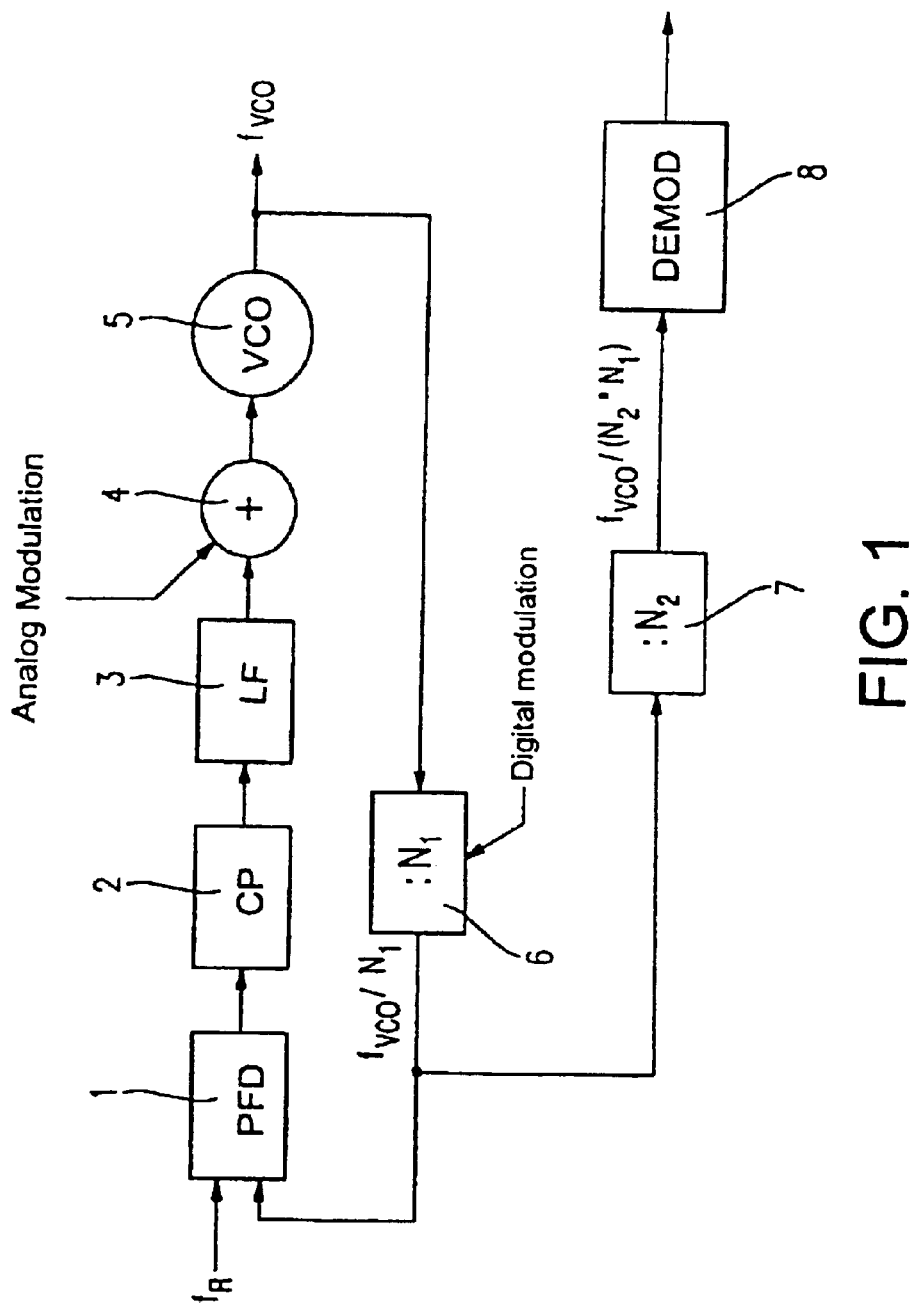
FIG. 1 is a block diagram of a PLL circuit configuration that operates on the principle of two-point modulation and in which a trimming method can be used for a transmitter/receiver which uses two-point modulation, based on a preferred exemplary embodiment of the invention.

Referring now to the figures of the drawing in detail and first, particularly, to FIG. 1 thereof, there is shown a PLL (phase locked loop) circuit configuration which operates on the principle of two-point modulation and in which a trimming method (tuning, calibrating) can be used for a transmitter/receiver (transceiver) using two-point modulation, according to the invention.

Figure 3:
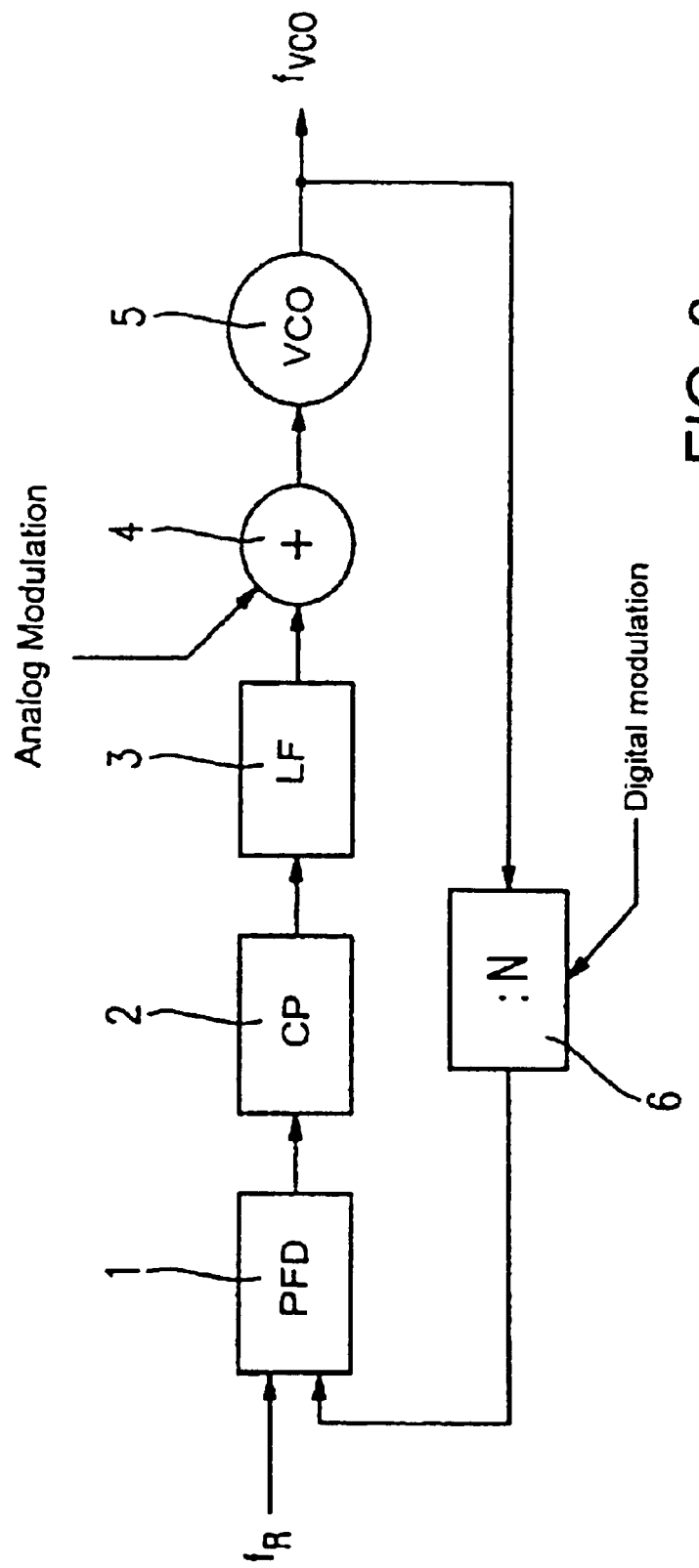
FIG. 3 is a simplified block diagram of a prior art PLL circuit that operates on the principle of two-point modulation.

Similarly to the prior art PLL circuit shown in FIG. 3, there is provided a phase frequency detector (PFD) 1, a charge pump (CP) 2, a loop filter (LF) 3, a summation point 4 and a voltage controlled oscillator (VCO) 5 in the forward path, i.e., in the signal flow direction. There is also provided a first frequency divider 6 with a first divisor $N_1$ in the feedback path, of the PLL circuit configuration according to the invention. Also, the PLL circuit is likewise already stabilized at the channel mid-frequency before the transmission process.

There is provided, in accordance with the invention, a second frequency divider 7 with a second divisor $N_2$ in a signal path that branches off from the feedback path of the PLL circuit after the first frequency divider 6. The second frequency divider 7 is followed by an FM demodulator 8 as part of a heterodyne receiver (which is not illustrated) which is known per se and operates on the limiter/discriminator principle.

The method of operation of the circuit configuration illustrated in FIG. 1 will be described in more detail in the following text.

First of all, a reference frequency $f_R$ is supplied to a first input of the phase frequency detector 1 in the PLL circuit. The reference frequency $f_R$ is compared in the phase frequency detector 1 with the frequency in the feedback path downstream from the first frequency divider 6, and a control signal is produced, which is processed in a known manner in the charge pump 2, the loop filter 3 and the voltage controlled oscillator 5. An output signal at the frequency $f_{vco}$ thus appears at the output of the voltage controlled oscillator. The output signal $f_{vco}$ in the voltage controlled oscillator 5 is supplied to the first frequency divider 6, which is located in the feedback path of the PLL circuit and whose divisor is $N_1$ and the output of this first frequency divider 6 in consequence produces a signal at the frequency $f_{vco}/N_1$.

In order to produce the two-point modulation, analog modulation is introduced into the PLL circuit at the summation point 4 which is located upstream of the voltage controlled oscillator 5 in the forward path of the PLL circuit, and digital modulation is introduced into the PLL circuit at the first frequency divider 6 in the feedback path of the PLL circuit.

The digitally modulated output signal $f_{vco}/N_1$ from the first frequency divider 6 is then supplied to a second input of the phase frequency detector 1 and to a second frequency divider 7, which is located in a signal path which branches off from the feedback path of the PLL circuit after the first frequency divider 6 and whose divisor is $N_2$.

The second frequency divider 7 divides the output signal $f_{vco}/N_1$ from the first frequency divider 6 by its divisor $N_2$, so that the output of the second frequency divider 7 produces a further divided output signal at the frequency $f_{vco}/(N_2*N_1)$.

The output signal $f_{vco}/(N_2*N_1)$ from the second frequency divider 7 is then supplied to the downstream FM demodulator 8, and is demodulated by it.

The divisor $N_2$ of the second frequency divider 7 is in this case preferably selected such that the output frequency $f_{vco}/(N_2*N_1)$ corresponds to the intermediate frequency of the heterodyne receiver. This means that, advantageously, there is no need for a second complete PLL control loop in the receiver for down-mixing the output signal $f_{vco}$ from the voltage controlled oscillator 5.

Since, owing to the possible frequency offsets, the receiver is generally suitable for a wider frequency range, the divisor $N_2$ for the second frequency divider 7 may also alternatively be selected such that its output frequency $f_{vco}/(N_2*N_1)$ is located essentially in the vicinity of the intermediate frequency, corresponding to a frequency offset. The precise location of the output frequency $f_{vco}/(N_2*N_1)$ is, however, known and can thus be taken into account in an appropriate manner.

This advantageously results in an additional degree of freedom for the selection of the divisor $N_2$, as will be explained in more detail in the following text.

The output signal from the frequency divider 7 is, furthermore, a digital signal. Since the downstream receiver operates on the limiter/discriminator principle and can also be designed to process the discrete-value, continuous output signals from the limiter in both a digital manner and in analog manner, the digital output signal from the frequency divider 7 is in consequence suitable for use as an input signal for this receiver, if it is fed in after the limiter.

It should be noted that two output signals, phase-shifted through 90°, are required from the second frequency divider 7 when processing complex-value signals, in an equivalent manner to the complex-value limiter output signals.

A refinement such as this is feasible in particular for even-numbered divisors $N_2$, which can advantageously be selected on the basis of the additional degree of freedom as mentioned above.

Figure 2:
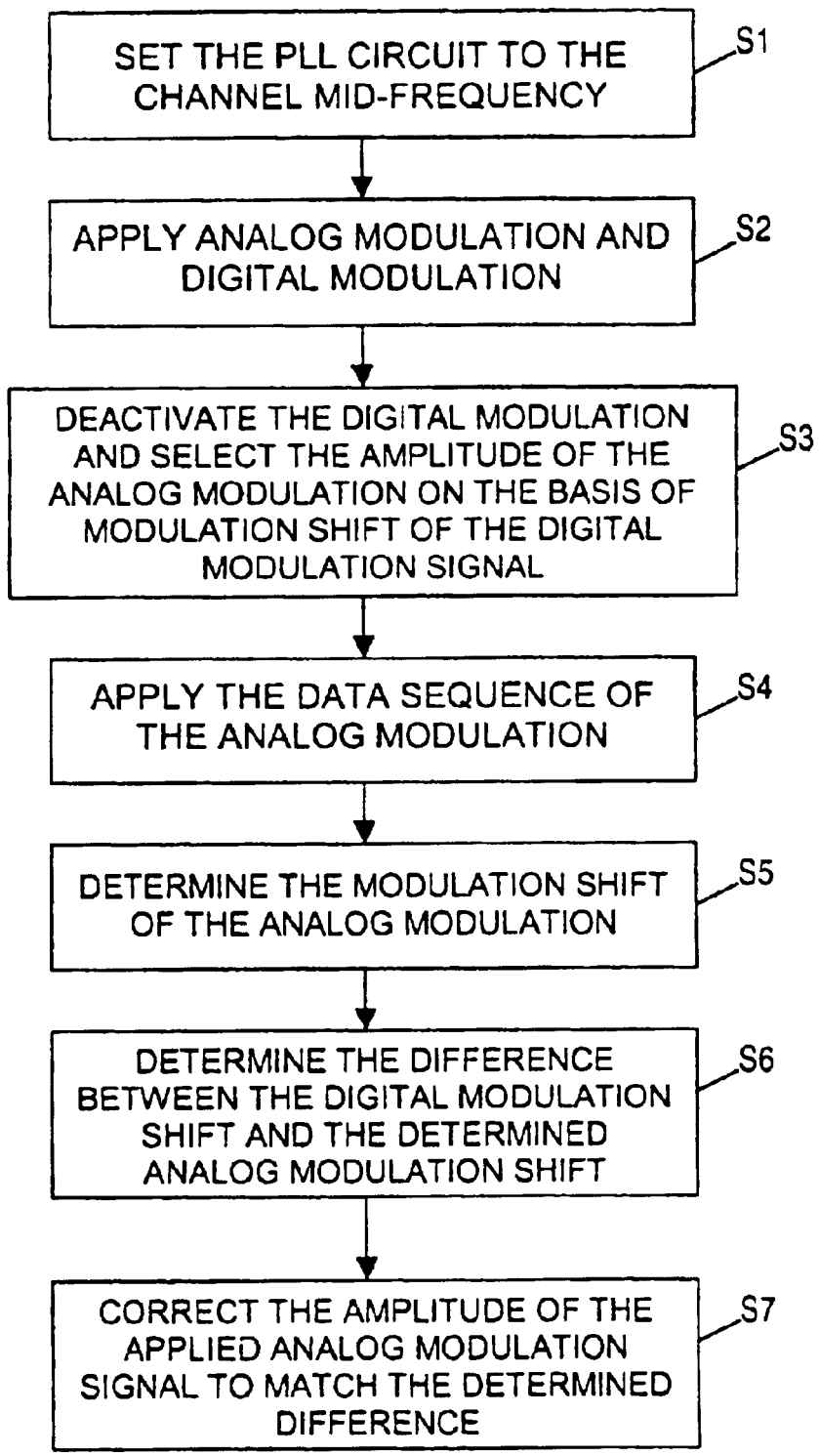
FIG. 2 is a simplified flowchart of the trimming method according to the preferred exemplary embodiment of the invention.

The trimming method which can be used for the PLL circuit as described above will be described in more detail in the following text with reference to the flowchart shown in FIG. 2.

In a first step S1, the PLL circuit is as a preparatory measure set to the channel mid-frequency before a transmission process. A setting process such as this is required in any case for operation, even if the trimming method is not carried out.

Analog modulation and digital modulation are then applied, as described above, in a second step S2.

In a third step S3, the digital modulation introduced at the first frequency divider 6 is deactivated, and the amplitude of the analog modulation signal which is introduced at the summation point 4 is selected such that it corresponds to the modulation shift which is set for the digital modulation signal and which has no tolerances by virtue of its digital form.

The digital modulation is thus deactivated during the trimming process, and only the analog modulation is used. Since the closed PLL control loop would regulate out the analog modulation, the assessment of the influence of this modulation must be carried out at times defined in advance during the transient phase.

A suitable data sequence of the analog modulation is then applied in a fourth step S4.

The modulation shift produced by the analog modulation is then determined at the output of the demodulator 8 of the receiver, in a fifth step S5.

After this, the difference between the modulation shift of the nominally set digital modulation signal and the determined modulation shift of the applied analog modulation signal is determined in a sixth step S6.

Finally, in a seventh step S7, the amplitude of the applied analog modulation signal is corrected in order to match the difference between the nominally set digital modulation shift and the determined analog modulation shift.

The described method thus makes it possible to obtain qualitative statements relating to the error that has occurred in a simple manner, and to determine a suitable correction value simply by subtraction.

As has been described above, in a method for amplitude trimming in transceivers for mobile radio systems having a PLL circuit, which operates on the principle of two-point modulation, in the transmitter and having a receiver which operates on the limiter/discriminator principle, the amplitude of an analog modulation signal is selected on the basis of a modulation shift of a defined digital modulation signal, a predetermined data sequence of the analog modulation signal is applied, the modulation shift of the analog modulation signal at the output of a demodulator of the receiver is determined, and the amplitude of the analog modulation signal is corrected in order to match the difference between the modulation shift of the digital modulation signal and the determined modulation shift of the analog modulation signal.

We claim:

1. A trimming method for a transmitter/receiver having a phase locked loop circuit operating on a two-point modulation principle, the method which comprises:

selecting an amplitude of an analog modulation signal based on a modulation shift of a defined digital modulation signal;

applying a predetermined data sequence of the analog modulation signal;

determining a modulation shift of the analog modulation signal at an output of the receiver; and correcting the amplitude of the analog modulation signal to match a difference between the modulation shift of the digital modulation signal and the modulation shift of the analog modulation signal.

2. The method according to claim 1, which comprises setting the phase locked loop circuit a channel mid-frequency before a transmission process.

3. The method according to claim 1, which comprises deactivating the digital modulation signal during the trimming process.

4. The method according to claim 1, which comprises applying the predetermined data sequence of the analog modulation signal to a predetermined high-pass point in a forward path of the phase locked loop circuit.

5. The method according to claim 1, which comprises applying the digital modulation signal to a predetermined low-pass point in a feedback path of the phase locked loop circuit.

6. The method according to claim 5, which comprises applying the digital modulation signal to a first frequency divider.

7. The method according to claim 1, wherein the phase locked loop circuit has a feedback path, a first frequency divider in the feedback path, and an output carrying an output signal, and the method comprises passing the output signal from the output of the phase locked loop circuit to a second frequency divider located in a signal path branching off from the feedback path.

8. The method according to claim 7, which comprises dividing the output signal from the phase locked loop circuit in the second frequency divider, and then supplying the divided signal as one input signal to the receiver.

9. The method according to claim 7, which comprises selecting a divisor for the second frequency divider such that an output frequency from the second frequency divider corresponds to an intermediate frequency of the receiver.

10. The method according to claim 9, which comprises selecting an integer value as the divisor for the second frequency divider.

11. The method according to claim 7, which comprises selecting an integer divisor for the second frequency divider.

12. The method according to claim 10, which comprises selecting the integer value such that an output frequency of the second frequency divider lies in a vicinity of the intermediate frequency of the receiver.

* * * * *